(12) United States Patent
Bugdary et al.

(10) Patent No.: US 11,295,423 B2
(45) Date of Patent: Apr. 5, 2022

(54) UNSUPERVISED TRAINING OF NEURAL NETWORK FOR HIGH DYNAMIC RANGE IMAGE COMPRESSION

(71) Applicant: Intel Corporation, Santa Clara, CA (US)

(72) Inventors: Shlomo Bugdary, Rishon le Zion (IL); Rony Zatzarinni, Haifa (IL)

(73) Assignee: Intel Corportation, Santa Clara, CA (US)

( * ) Notice: Subject to any disclaimer, the term of this patent is extended or adjusted under 35 U.S.C. 154(b) by 73 days.

(21) Appl. No.: 16/694,286

(22) Filed: Nov. 25, 2019

(65) Prior Publication Data

US 2020/0090313 A1 Mar. 19, 2020

(51) Int. Cl.
*G06T 5/00* (2006.01)
*G06T 5/50* (2006.01)
*G06N 3/04* (2006.01)
*G06T 9/00* (2006.01)
*G06N 3/08* (2006.01)

(52) U.S. Cl.
CPC ............ *G06T 5/009* (2013.01); *G06N 3/084* (2013.01); *G06T 5/50* (2013.01); *G06T 2207/20208* (2013.01)

(58) Field of Classification Search
CPC . G06T 5/009; G06T 5/50; G06T 2207/20208; G06T 9/002; G06N 3/084; G06N 3/088; G06N 3/063; G06N 3/0454
See application file for complete search history.

(56) References Cited

U.S. PATENT DOCUMENTS

| 2014/0092012 A1* | 4/2014 | Seshadrinathan ....... G06T 5/007 345/157 |
| 2019/0096046 A1* | 3/2019 | Kalantari .................. G06T 5/50 |
| 2019/0147221 A1* | 5/2019 | Grabner .................... G06T 7/75 382/103 |

OTHER PUBLICATIONS

Rana et al., "Deep Tone Mapping Operator for High Dynamic Range Images", arXiv:1908.04197v1, Aug. 12, 2019, 14 pages.
Farbman et al., "Edge preserving decompositions for multi-scale tone and detail manipulation", retrieved from www.cs.huji.ac.il/~danix/epd/epd-small.pdf, 2008, 10 pages.
(Continued)

*Primary Examiner* — John W Lee
(74) *Attorney, Agent, or Firm* — Hanley, Flight & Zimmerman, LLC (57) ABSTRACT

Techniques are provided for unsupervised training of a neural network to perform compression of a high dynamic range (HDR) image. A methodology implementing the techniques according to an embodiment includes performing global tone mapping on an HDR training image to generate a low dynamic range (LDR) training image. The method also includes applying the neural network to the HDR training image and the LDR training image to generate a delta image representing image detail lost in the global tone mapping operation. The method further includes summing the delta image with the LDR training image to generate an output training image, and generating a loss function calculated from a weighted sum of a contrast loss and a compression loss. The contrast loss is based on the output training image and the HDR training image, and the compression loss is based on the output training image and the LDR training image.

20 Claims, 8 Drawing Sheets

(56) References Cited

OTHER PUBLICATIONS

Chesnokov, Vyacheslav, "Image enhancement methods and apparatus therefore," United States Patent U.S. Pat. No. 7,302,110 B2, Nov. 27, 2007, 33 pages.
Maymon, S and H Barel, "Contrast Optimization and Local Adaptation (COALA) for HDR compression", arXiv:1905.06372v1, May 15, 2019, 6 pages.
Eilertsen, G. et al., "A comparative review of tone-mapping algorithms for high dynamic range video", Eurographics 2017, vol. 36, 28 pages.
Durand F and J. Dorsey, "Fast bilateral filtering for the display of high-dynamic-range images", Proc. ACM SIGGRAPH, 2002, 10 pages.
Hou X et al., "Deep Feature Consistent Deep Image Transformations: Downscaling, Decolorization and HDR tone mapping", arXiv:1707.09482v2, Sep. 11, 2017, 12 pages.
Patel,V.A. et al., "A generative adversarial network for tone mapping HDR images", Computer Vision, Pattern Recognition, Image Processing, and Graphics, NCVPRIPG 2017, Communications in Computer and Information Science, pp. 220-231, 2018.

* cited by examiner

UNSUPERVISED TRAINING OF NEURAL NETWORK FOR HIGH DYNAMIC RANGE IMAGE COMPRESSION

BACKGROUND

High dynamic range (HDR) imaging is a technique, used in imaging and photography, to reproduce a greater dynamic range of luminosity than is possible with standard digital imaging or photographic techniques. The goal of HDR imaging is to present a range of luminance which is comparable to that experienced through the human visual system. The human eye, through adaptation of the iris and other mechanisms, undergoes continuous adjustments to adapt to a broad range of luminance present in the visual environment. The brain continuously interprets this information so that a viewer can see under a wide range of lighting conditions.

Unfortunately, due to the contrast limitations of existing print and display technology, the extended luminosity range of an HDR image cannot be adequately reproduced or displayed without the use of some form of tone mapping or compression to reduce the number of bits used to represent the luminosity of each pixel. Existing image compression techniques, however, suffer from a wide range of problems, and limitations. These include the introduction of unwanted artifacts (e.g., halos, reversal gradients, loss of detail, and uneven or flat lighting) into the compressed image.

Although the following Detailed Description will proceed with reference being made to illustrative embodiments, many alternatives, modifications, and variations thereof will be apparent in light of this disclosure.

DETAILED DESCRIPTION

Techniques are provided for unsupervised training of a neural network to perform compression of an HDR image. As previously noted, HDR images reproduce a greater dynamic range of luminosity than is possible with standard digital imaging or photographic techniques. These HDR images, however, need to undergo some form of tone mapping or compression in order to be displayed or printed in a satisfactory manner, due to the dynamic range limitations of printers and display devices. For example, it is common for an HDR image to use 20 bits to represent the luminosity of each pixel, whereas a typical display device represents each pixel with fewer bits (e.g., on the order of 8 bits), which is referred to herein as low dynamic range (LDR). Existing analytical approaches to HDR compression typically introduce undesirable image artifacts. Alternatively, neural networks can be applied to the image compression problem, but these networks need to be trained in a supervised fashion, requiring a large database of labelled training images and calibrated ground truth images. The generation of calibrated ground truth images typically involves manual tuning of a relatively large number of parameters for each image by an image quality expert, which is expensive, time-consuming and impractical for most purposes.

To this end, an example embodiment of the present disclosure provides a methodology that can be used to train a neural network to perform HDR image compression in an unsupervised manner that does not require ground truth images or the manual tuning of many calibration parameters by an image quality expert. The methodology includes use of a loss function (sometimes called a cost function) that preserves contrast of the HDR image while compressing the image range. This methodology enables relatively rapid and efficient training of the neural network, which can be used in an HDR image compression system that achieves high image quality results. An example system for carrying out the methodology is also provided.

The disclosed techniques can be implemented, for example, in a computing system or a software product executable or otherwise controllable by such systems, although other embodiments will be apparent. The system or product is configured to train and execute a neural network to perform compression of an HDR image. In accordance with such an embodiment, a methodology to implement these techniques includes performing global tone mapping (GTM) on an HDR training image to generate an LDR training image. The method also includes applying the neural network (in training) to the HDR training image and the LDR training image to generate a delta image representing image detail lost in the global tone mapping operation. The method further includes summing the delta image with the LDR training image to generate an output training image, and generating an unsupervised loss function calculated from a weighted sum of a contrast loss and a compression loss. The contrast loss is based on the output training image and the HDR training image, and the compression loss is based on the output training image and the LDR training image. Iterative backpropagation training of the neural network may then be performed to minimize the loss function over each iteration, such that the output training image converges to a desired compressed HDR image. The weighted sum is based on a parameter that can be selected to control the ratio of (or trade-off between) degree of compression and preservation of contrast in the compressed HDR image. The trained neural network can then be used as part of a system to perform compression of HDR images, as will be explained in greater detail below.

As will be appreciated, the techniques described herein may provide improved HDR image compression, compared to existing techniques that either employ analytically-based calculations which can introduce undesirable image artifacts, or that utilize neural networks which have been trained in a supervised manner that is expensive and inefficient. The disclosed techniques can be implemented on a broad range of platforms including workstations, laptops, tablets, and smartphones. These techniques may further be implemented in hardware or software or a combination thereof.

System Architecture

Figure 1:
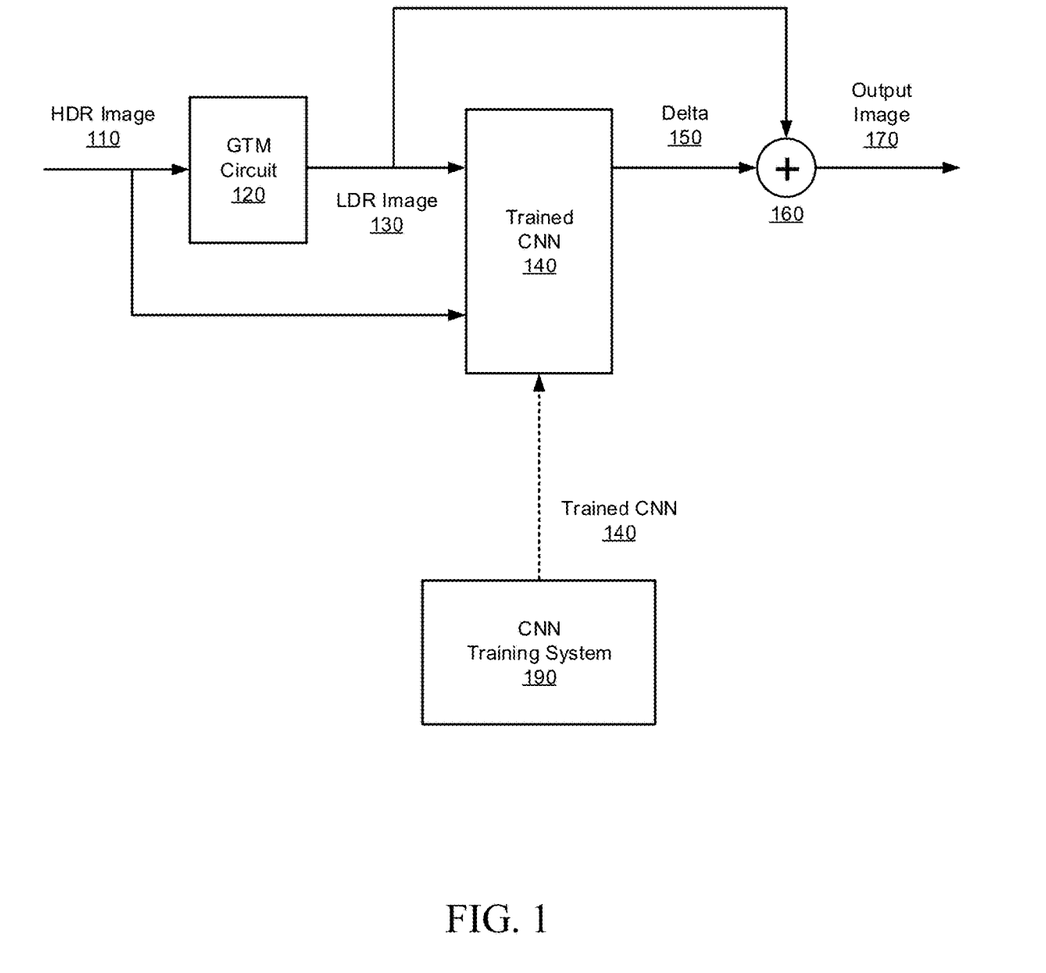
FIG. 1 is a top-level block diagram of an HDR image compression system, configured in accordance with certain embodiments of the present disclosure.

FIG. 1 is a top-level block diagram of an HDR image compression system 100, configured in accordance with certain embodiments of the present disclosure. The HDR image compression system 100 is shown to include a GTM circuit 120, a trained convolutional neural network (CNN) 140, and a summing circuit 160. Also shown is the CNN training system 190, which is configured to generate the trained CNN 140, as will be explained in greater detail below, in connection with FIGS. 2 and 3. In some embodiments, the CNN training system 190, may be deployed separately from the HDR image compression system 100.

The GTM circuit 120 is configured to perform a global tone mapping operation on the HDR image 110 to transform the HDR image into a low dynamic range (LDR) image 130. The resulting LDR image 130 has a lower dynamic range (e.g., lower range of luminosity) than the HDR image 110, and will typically suffer from the introduction of undesirable artifacts and a loss of low contrast image details. In some embodiments, the GTM circuit 120 may employ the contrast optimization and local adaptation (COALA) compression operator, although other existing compression schemes may be used in light of the present disclosure.

The trained CNN 140 is configured to operate on the HDR image 110 and the LDR image 130 to generate a delta image 150, which represents the details missing from the LDR image relative to the HDR image.

The summing circuit 160 is configured to add the delta image 150 to the LDR image 130 to generate the output image 170. The output image 170 is a compressed version of the HDR image 110 to which the lost details have been restored.

Figure 2:
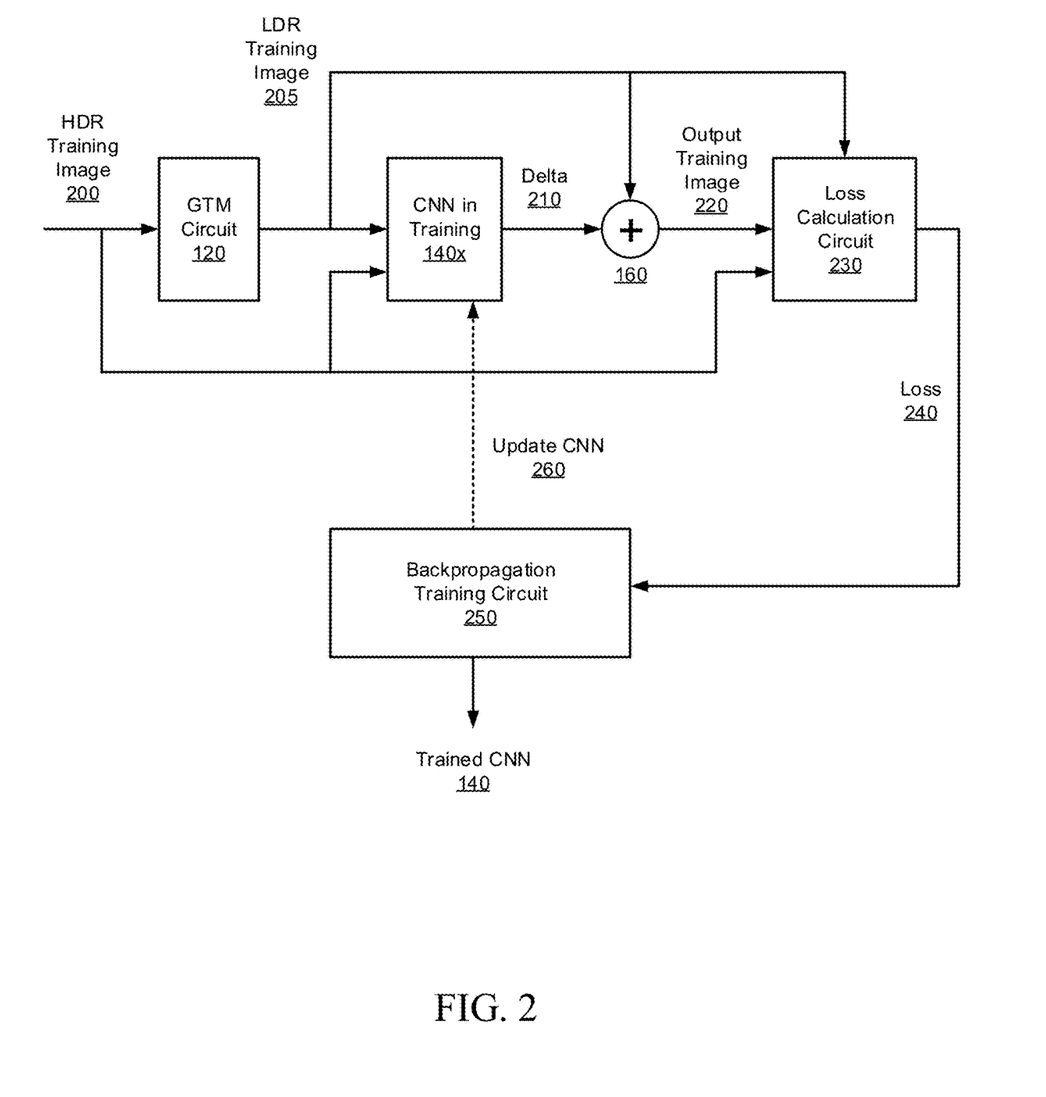
FIG. 2 is a block diagram of a system for training of a neural network to perform HDR image compression, configured in accordance with certain embodiments of the present disclosure.

FIG. 2 is a block diagram of a system 190 for unsupervised training of a neural network to perform HDR image compression, configured in accordance with certain embodiments of the present disclosure. The CNN training system 190 is shown to include the GTM circuit 120, the CNN undergoing training 140x, summing circuit 160, loss calculation circuit 230, and backpropagation on training circuit 250.

The GTM circuit 120 is configured to perform a global tone mapping operation, as previously described, on an HDR training image 200 to transform the HDR training image into an LDR training image 205. The resulting LDR training image 205 has a lower dynamic range than the HDR training image 200, and will typically suffer from the introduction of undesirable artifacts and a loss of low contrast image details.

The CNN in training 140x is trained, through an iterative backpropagation process as described below, to generate a delta training image 210 which represents the details missing from the LDR training image 205 relative to the HDR training image 200.

The summing circuit 160 is configured to add the delta training image 210 to the LDR training image 205 to generate an output training image 220. The output training image 220 is a compressed version of the HDR training image 200 to which lost details have been restored to some extent.

The loss calculation circuit 230 is configured to calculate a loss function 240, for use in the backpropagation process, as a weighted sum of a contrast loss and a compression loss, as will be described in greater detail below in connection with FIG. 3. The loss function does not require or depend upon ground truth data, and as such, the training process is unsupervised. The contrast loss is based on the output training image 220 and the HDR training image 200. The compression loss is based on the output training image 220 and the LDR training image 205.

The backpropagation training circuit 250 is configured to perform iterative backpropagation training of the neural network 140x, to minimize the loss function 240, such that the output training image 220 converges to a compressed HDR image, at which point the CNN in training 140x becomes the trained CNN 140. In some embodiments, training iterations may cease when the loss function reaches a selected threshold value.

Figure 3:
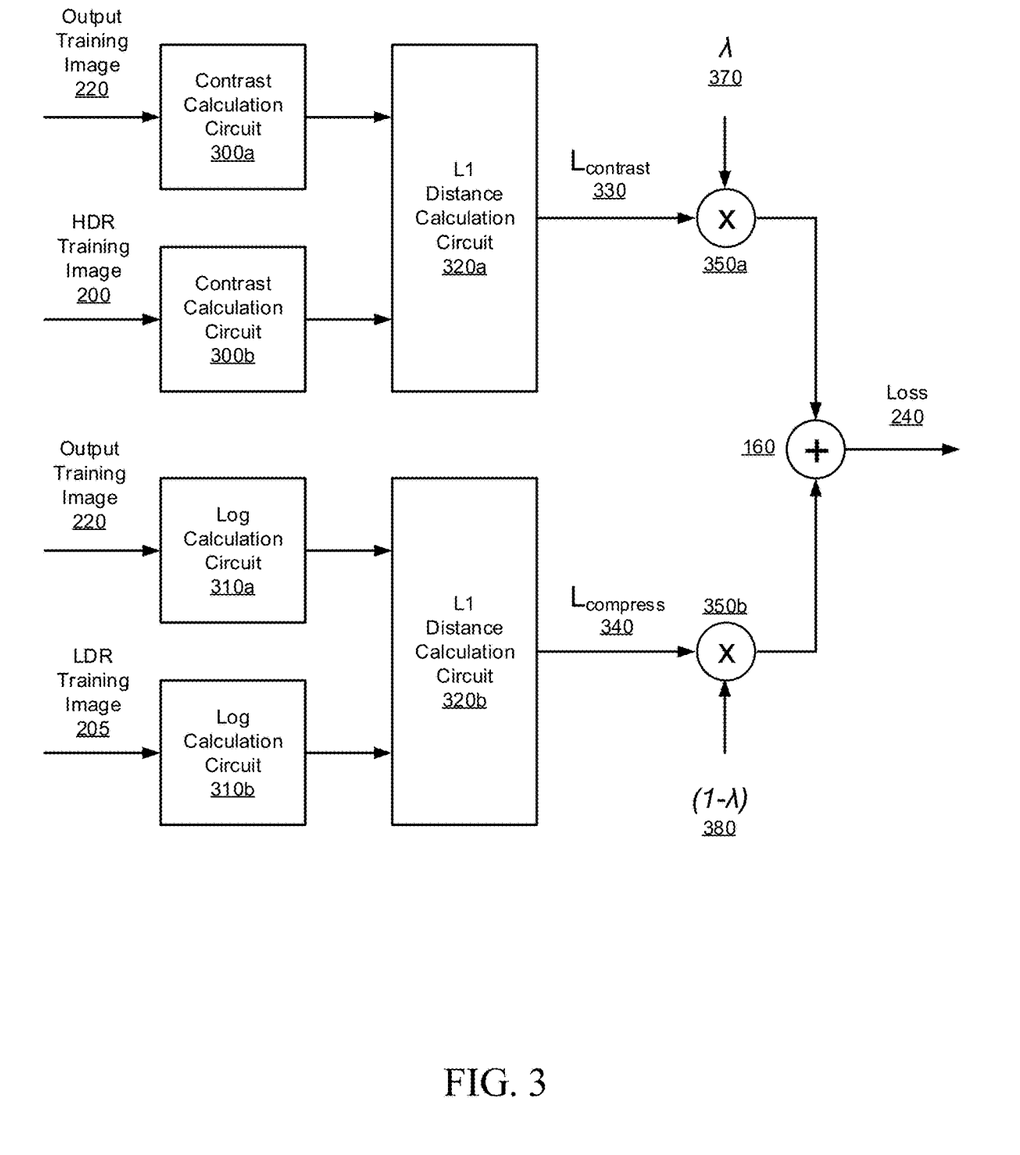
FIG. 3 is a block diagram of a loss calculation circuit, configured in accordance with certain embodiments of the present disclosure.

FIG. 3 is a block diagram of a loss calculation circuit 230, configured in accordance with certain embodiments of the present disclosure. The loss calculation circuit 230 is shown to include a contrast calculation circuits 300, logarithm calculation circuits 310, L1 distance calculation circuits 320, multiplication circuits 350, and summing circuit 160. As previously mentioned, the loss function 240 is calculated as a weighted sum of a contrast loss 330 and a compression loss 340.

The contrast loss 330 is calculated as follows. Contrast calculation circuit 300a is configured to calculate the contrast of the output training image 220, and contrast calculation circuit 300b is configured to calculate the contrast of the HDR training image 200. In some embodiments, these contrast calculations can be represented by the following equation:

$$\text{Contrast}(x, y) = \log\left(\frac{I(x+1, y+1)}{I(x, y)}\right)$$

where x,y specifies a location in the image and I is the luminous intensity at that location. In some embodiments, I may be calculated as a weighted average of the red, green, and blue pixels at the given location. The coordinates (x+1, y+1) represent a location that is adjacent to (x,y). In some embodiments, other suitable contrast metrics may be used. The L1 distance calculation circuit 320a is configured to calculate a rectilinear (L1) distance between the resulting calculated contrasts of the output training image and the HDR training image to generate the contrast loss 330. In some embodiments, other distance functions may be used, including, for example, an L2 (Euclidean) distance, or other suitable function which may be heuristically chosen based on image quality results. In some embodiments, the contrast loss 330 can be represented by the following equation:

$$L_{contrast} = L1(\text{Contrast}(\text{Output}), \text{Contrast}(\text{HDR}))$$

The compression loss 340 is calculated as follows. Log calculation circuit 310a is configured to calculate the logarithm of the intensity values of the output training image 220, and log calculation circuit 310b is configured to calculate the logarithm of the intensity values of the LDR training image 205. The L1 distance calculation circuit 320b is configured to calculate a rectilinear (L1) distance between the resulting calculated log intensities of the output training image and the LDR training image to generate the compression loss 340. In some embodiments, the compression loss 340 can be represented by the following equation:

$$L_{compress}=L1(\log(LDR),\log(output))$$

Multiplication circuits 350a and 350b, and summing circuit 160 are configured to generate the loss function 240 as the weighted sum of the contrast loss 330 and the compression loss 340, where $\lambda$ 370 and (I-$\lambda$) 380 are the weights. In some embodiments, the loss function 240 can be represented by the following equation:

$$Loss=(1-\lambda)*L_{compress}\lambda*L_{contrast}$$

The compression loss component 340 of the loss function 240 is employed to minimize the L1 distance between the LDR training image 205 and the output training image 220, thereby compressing the dynamic range. The contrast loss component 330 of the loss function 240 is employed to minimize the L1 distance between the contrast of the HDR training image 200 (with the original details), and the contrast of the output training image 220, thereby preserving the original contrast. The use of L1 distances reduces the likelihood that undesirable artifacts such as halos will be introduced into the resulting compressed image.

The process employs only one tunable parameter, the weighting factor $\lambda$370, which can be selected to control a trade-off between the level of compression and the degree of contrast preservation.

Figure 4:
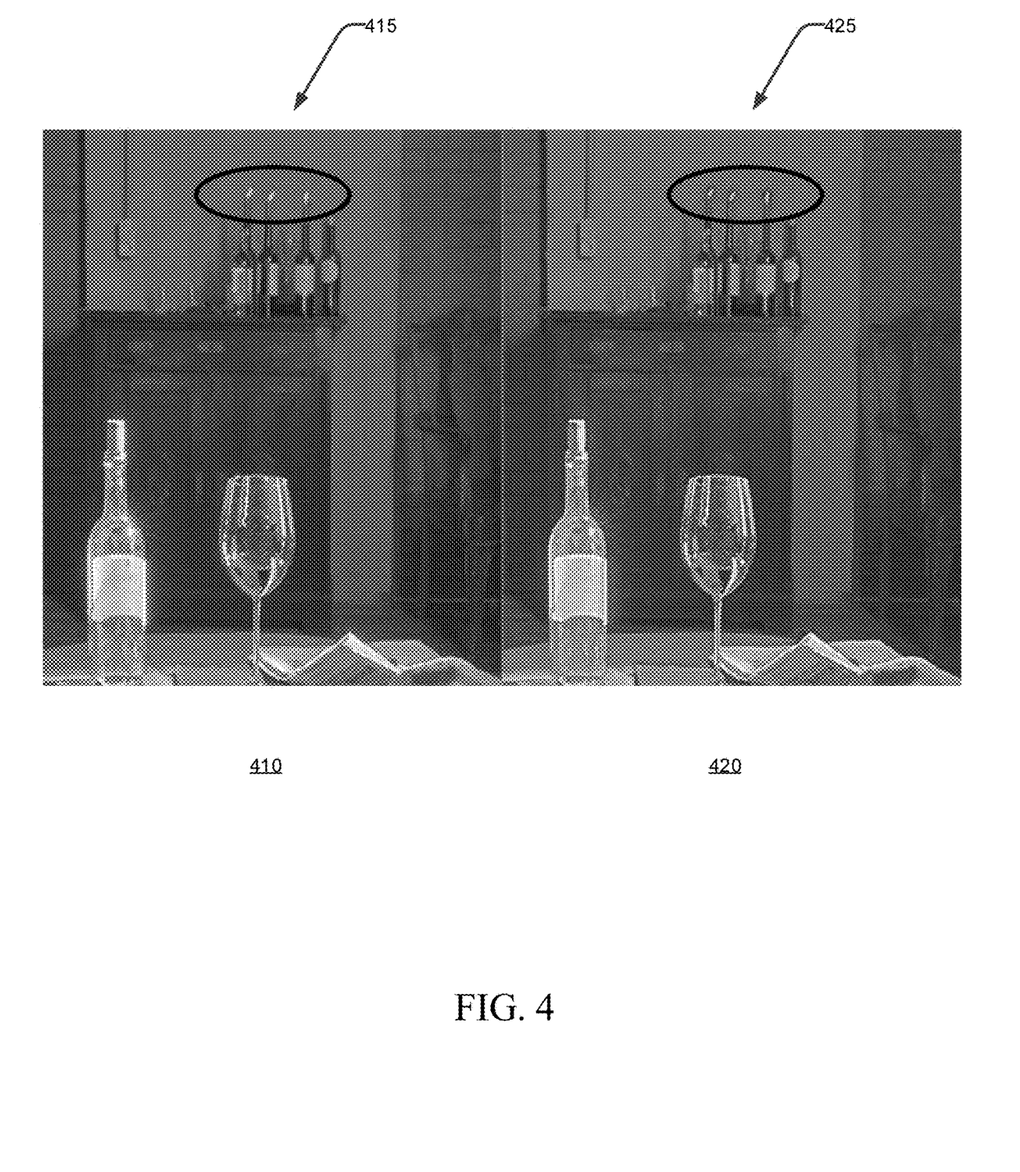
FIG. 4 illustrates a comparison of results of HDR compression techniques, in accordance with certain embodiments of the present disclosure.

FIG. 4 illustrates a comparison 400 of results of HDR compression techniques, in accordance with certain embodiments of the present disclosure. Image 410, on the left, illustrates the results of HDR compression using the disclosed techniques. In comparison, image 420, on the right, illustrates the results of HDR compression using existing (prior art) techniques. As can be seen, the candle flames 415 (in image 410) have not been degraded by the dark halo artifacts that are visible around the candle flames 425 (in image 420).

Figure 5:
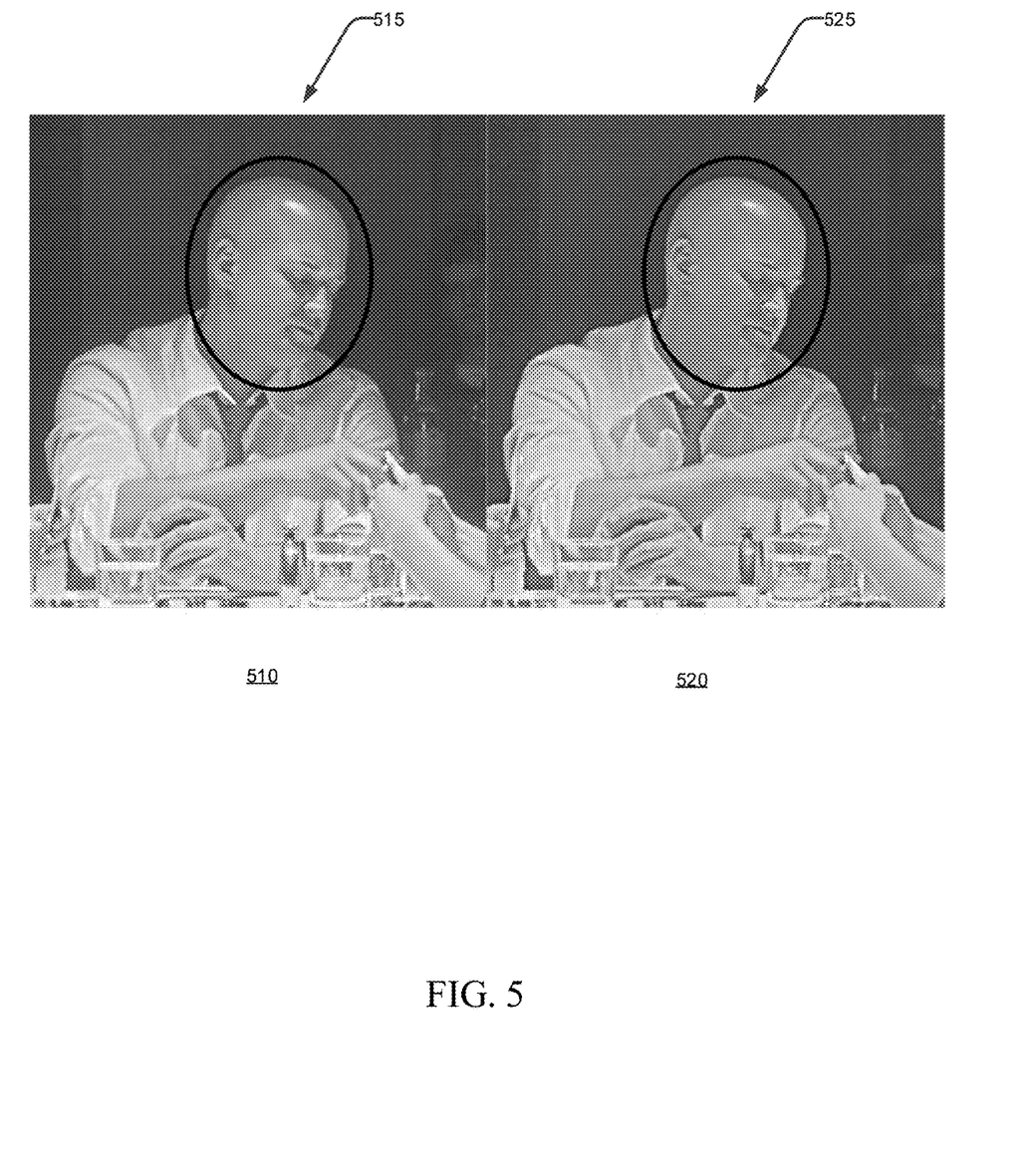
FIG. 5 illustrates another comparison of results of HDR compression techniques, in accordance with certain embodiments of the present disclosure.

FIG. 5 illustrates another comparison 500 of results of HDR compression techniques, in accordance with certain embodiments of the present disclosure. Here again, image 510, on the left, illustrates the results of HDR compression using the disclosed techniques. In comparison, image 520, on the right, illustrates the results of HDR compression using existing (prior art) techniques. As can be seen, the disclosed techniques render more realistic and natural looking images, particularly in the facial area 515, where additional detail can be seen, compared to the facial area 525, which has a flatter appearance with details having been washed out.

Figure 6:
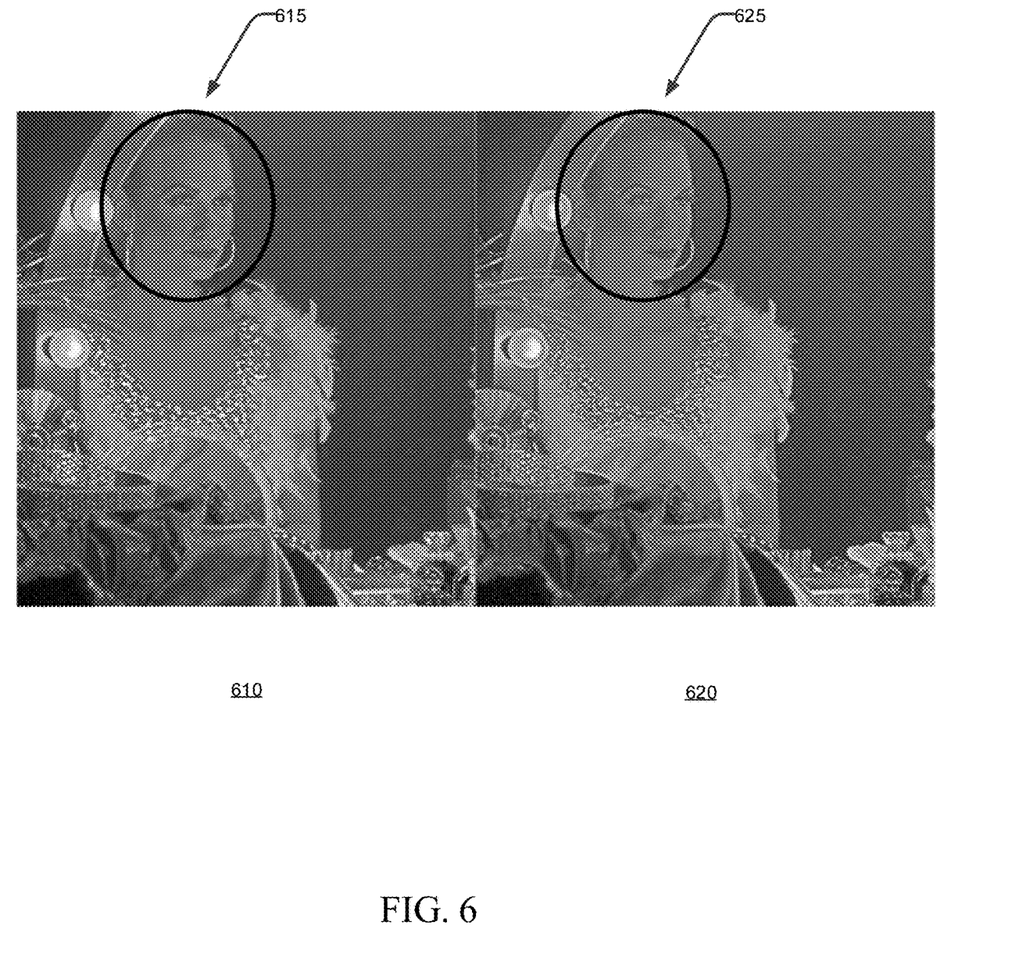
FIG. 6 illustrates another comparison of results of HDR compression techniques, in accordance with certain embodiments of the present disclosure.

FIG. 6 illustrates a further comparison 600 of results of HDR compression techniques, in accordance with certain embodiments of the present disclosure. Here again, image 610, on the left, illustrates the results of HDR compression using the disclosed techniques. In comparison, image 620, on the right, illustrates the results of HDR compression using existing (prior art) techniques. As previously described in connection with FIG. 5, the disclosed techniques render more realistic and natural looking images in the facial area 615, where additional detail can be seen, compared to the facial area 625, which has a flatter appearance with details having been washed out.

Methodology

Figure 7:
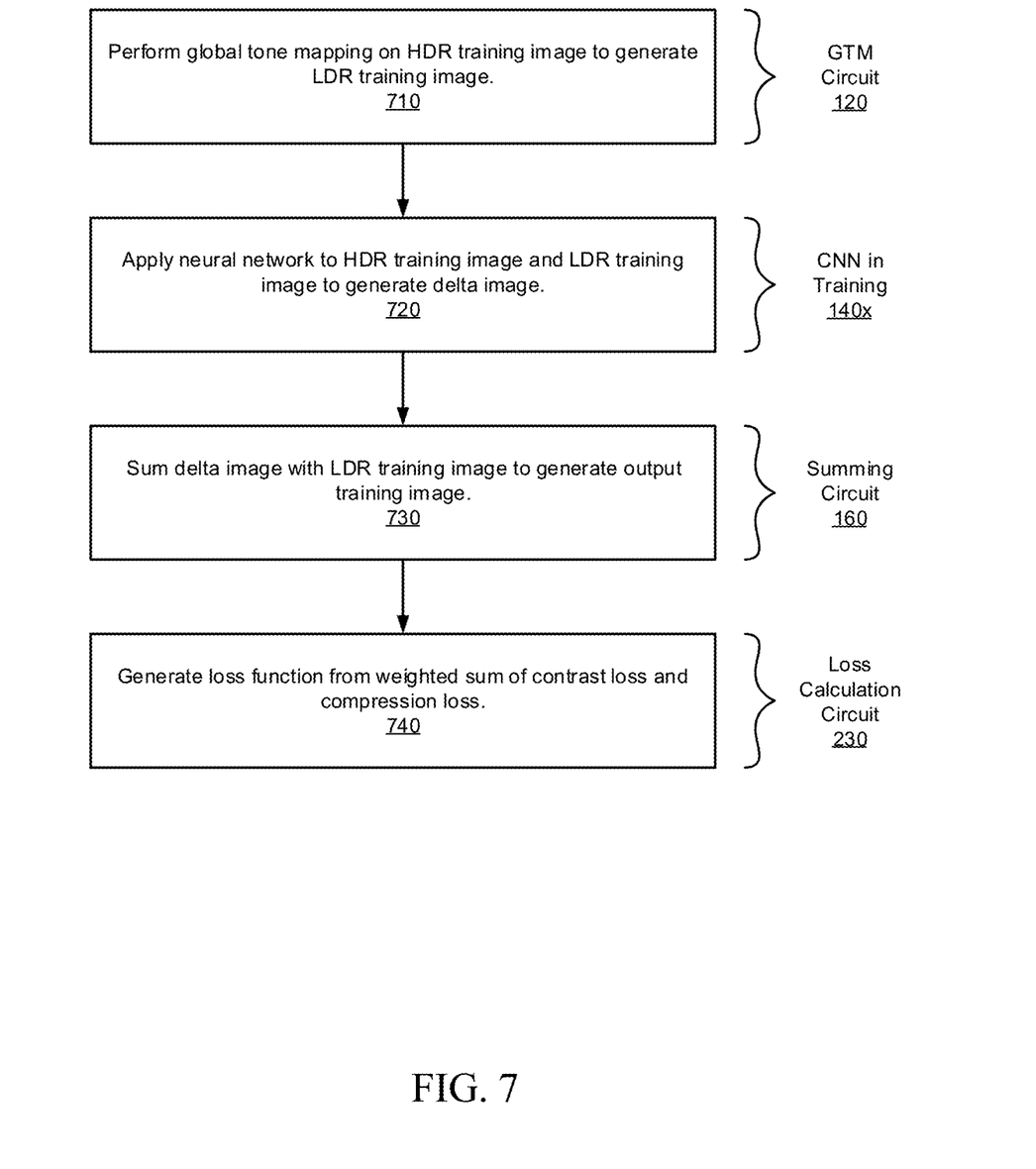
FIG. 7 is a flowchart illustrating a methodology for training of a neural network to perform HDR image compression, in accordance with certain embodiments of the present disclosure.

FIG. 7 is a flowchart illustrating an example method 700 for training of a neural network to perform HDR image compression, in accordance with certain embodiments of the present disclosure. As can be seen, the example method includes a number of phases and sub-processes, the sequence of which may vary from one embodiment to another. However, when considered in the aggregate, these phases and sub-processes form a process for neural network training, in accordance with certain of the embodiments disclosed herein. These embodiments can be implemented, for example, using the system architecture illustrated in FIGS. 1-3, as described above. However other system architectures can be used in other embodiments, as will be apparent in light of this disclosure. To this end, the correlation of the various functions shown in FIG. 7 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 700. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 7, in an embodiment, method 700 for unsupervised training of a neural network commences by performing, at operation 710, global tone mapping on an HDR training image to generate an LDR training image. In some embodiments, the neural network is a convolutional neural network.

Next, at operation 720, the neural network (in training) is applied to the HDR training image and the LDR training image to generate a delta image. The delta image represents the image details that were lost in the global tone mapping operation.

At operation 730, the delta image is summed with the LDR training image to generate an output training image.

At operation 740, a loss function is calculated, based on a weighted sum of a contrast loss and a compression loss. The contrast loss is based on the output training image and the HDR training image, and the compression loss is based on the output training image and the LDR training image. Iterative backpropagation training of the neural network may then be performed to minimize the loss function over each iteration, such that the output training image converges to a desired compressed HDR image. The weighted sum is based on a parameter that can be selected to control the ratio of (or trade-off between) degree of compression and preservation of contrast in the compressed HDR image.

Of course, in some embodiments, additional operations may be performed, as previously described in connection with the system. For example, the contrast loss is calculated as a rectilinear (L1) distance between a calculated contrast of the output training image and a calculated contrast of the HDR training image. The compression loss is calculated as an L1 distance between the logarithm of the output training image and the logarithm of the LDR training image. In some embodiments, the calculated contrast of an image is calculated as the logarithm of the ratio of intensity of adjacent pixels of the image.

Example System

Figure 8:
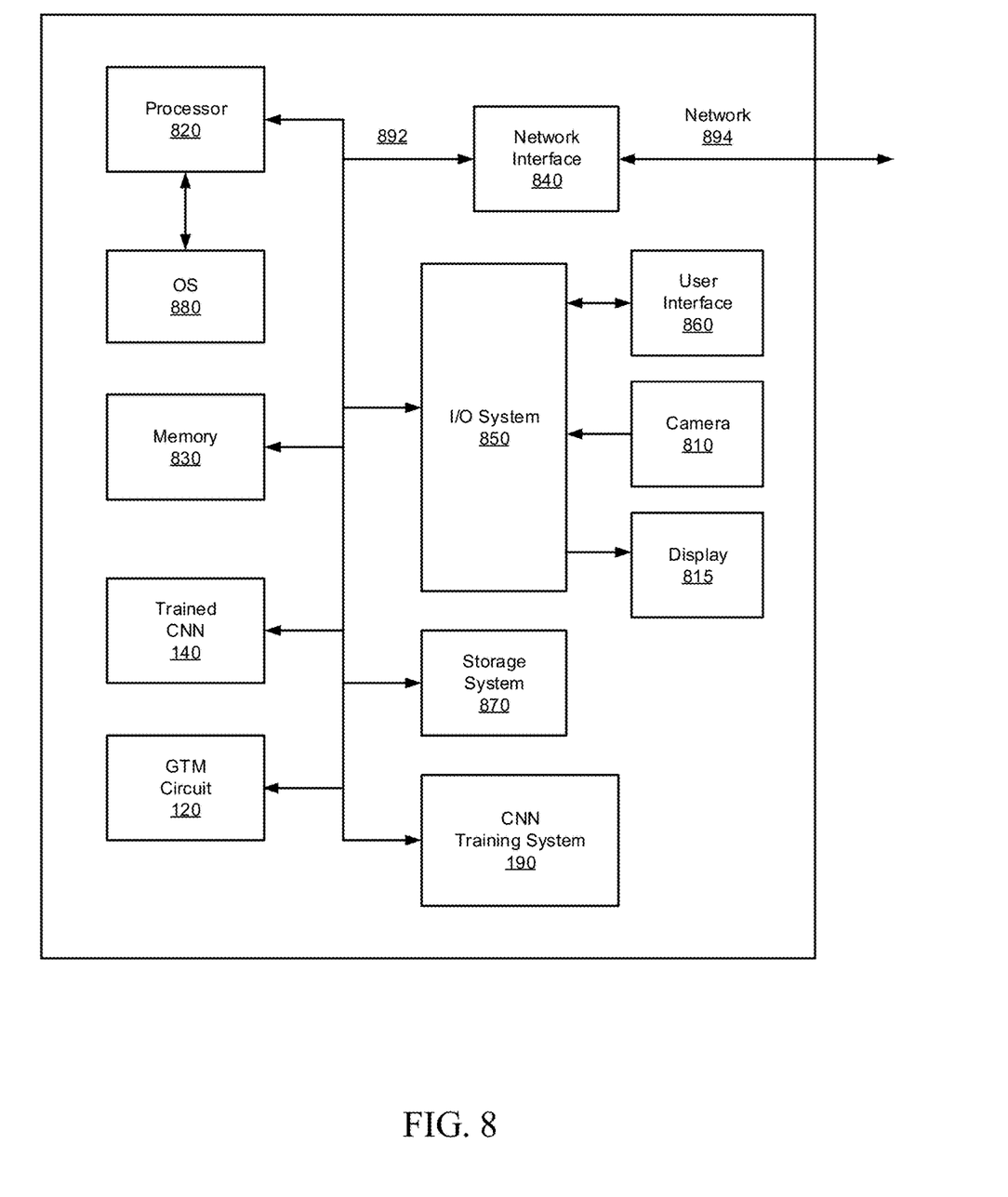
FIG. 8 is a block diagram schematically illustrating an image processing platform configured to perform HDR image compression, in accordance with certain embodiments of the present disclosure.

FIG. 8 illustrates an example image processing platform 800, configured in accordance with certain embodiments of the present disclosure, to provide compression of HDR images using a trained convolutional neural network. In some embodiments, platform 800 may be hosted on, or otherwise be incorporated into a personal computer, workstation, server system, smart home management system, laptop computer, ultra-laptop computer, tablet, touchpad, portable computer, handheld computer, palmtop computer, personal digital assistant (PDA), cellular telephone, combination cellular telephone and PDA, smart device (for example, smartphone, smart-speaker, or smart-tablet), mobile internet device (MID), messaging device, data communication device, wearable device, embedded system, and so forth. Any combination of different devices may be used in certain embodiments.

In some embodiments, platform 800 may comprise any combination of a processor 820, a memory 830, a trained CNN 140, a global tone mapping circuit 120, a CNN training system 190, a network interface 840, an input/output (I/O) system 850, a user interface 860, a camera 810, a display, 815, and a storage system 870. As can be further seen, a bus and/or interconnect 892 is also provided to allow for communication between the various components listed above and/or other components not shown. Platform 800 can be coupled to a network 894 through network interface 840 to allow for communications with other computing devices, platforms, devices to be controlled, or other resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with platform 800. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random-access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 800, and therefore may also be implemented using any suitable existing or subsequently-developed platform.

Network interface circuit 840 can be any appropriate network chip or chipset which allows for wired and/or wireless connection between other components of device platform 800 and/or network 894, thereby enabling platform 800 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of device platform 800. I/O devices may include, but not be limited to, user interface 860, camera 810, and display 815. Camera 810 may be configured to provide HDR images for compression processing, according to techniques disclosed herein, and display 815 may be configured to display the results of such compression processing. User interface 860 may include devices (not shown) such as a microphone, touchpad, keyboard, and mouse, etc. I/O system 850 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 800.

It will be appreciated that in some embodiments, the various components of platform 800 may be combined or integrated in a system-on-a-chip (SoC) architecture. In some embodiments, the components may be hardware components, firmware components, software components or any suitable combination of hardware, firmware or software.

CNN training system 190 is configured to train the CNN 140, using unsupervised training techniques, to perform compression of HDR images, in conjunction with global tone mapping circuit 120, as described previously. The HDR images may be provided to CNN 140 from camera 810, a database of HDR images, or from any other suitable source. CNN 140, GTM circuit 120, and CNN training system 190 may include any or all of the circuits/components illustrated in FIGS. 1-3, as described above. These components can be implemented or otherwise used in conjunction with a variety of suitable software and/or hardware that is coupled to or that otherwise forms a part of platform 800. These components can additionally or alternatively be implemented or otherwise used in conjunction with user I/O devices that are capable of providing information to, and receiving information and commands from, a user.

In some embodiments, these circuits may be installed local to platform 800, as shown in the example embodiment of FIG. 8. Alternatively, platform 800 can be implemented in a client-server arrangement wherein at least some functionality associated with these circuits is provided to platform 800 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 894 or remotely coupled to network 894 by one or more other networks and/or communication channels. In some cases, access to resources on a given network or computing system may require credentials such as usernames, passwords, and/or compliance with any other suitable security mechanism.

In various embodiments, platform 800 may be implemented as a wireless system, a wired system, or a combination of both. When implemented as a wireless system, platform 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for training a neural network to perform high dynamic range (HDR) image compression, the method comprising: performing, by a processor-based system, global tone mapping on an HDR training image to generate a low dynamic range (LDR) training image; applying, by the processor-based system, the neural network to the HDR training image and the LDR training image, the neural network to generate a delta image, the delta image representing image detail lost in the global tone mapping operation; summing, by the processor-based system, the delta image with the LDR training image to generate an output training image; calculating, by the processor-based system, a contrast loss, the contrast loss based on the output training image and the HDR training image; calculating, by the processor-based system, a compression loss, the compression loss based on the output training image and the LDR training image; and calculating, by the processor-based system, a loss function based on a weighted sum of the contrast loss and the compression loss.

Example 2 includes the subject matter of Example 1, further comprising performing iterative backpropagation training of the neural network based on the loss function, such that the output training image converges to a compressed HDR image.

Example 3 includes the subject matter of Examples 1 or 2, wherein the weighted sum is based on a parameter selected to control a ratio of compression to preservation of contrast in the compressed HDR image.

Example 4 includes the subject matter of any of Examples 1-3, wherein the contrast loss is calculated as a rectilinear distance between a calculated contrast of the output training image and a calculated contrast of the HDR training image.

Example 5 includes the subject matter of any of Examples 1-4, wherein the calculated contrast of an image is calculated as a logarithm of a ratio of intensity of adjacent pixels of the image.

Example 6 includes the subject matter of any of Examples 1-5, wherein the compression loss is calculated as a rectilinear distance between a logarithm of the output training image and a logarithm of the LDR training image.

Example 7 includes the subject matter of any of Examples 1-6, wherein the neural network is a convolutional neural network.

Example 8 includes the subject matter of any of Examples 1-7, wherein the training of the neural network is unsupervised.

Example 9 is at least one non-transitory computer readable storage medium having instructions encoded thereon that, when executed by one or more processors, cause a process to be carried out for training a neural network to perform high dynamic range (HDR) image compression, the process comprising: performing global tone mapping on an HDR training image to generate a low dynamic range (LDR) training image; applying the neural network to the HDR training image and the LDR training image, the neural network to generate a delta image, the delta image representing image detail lost in the global tone mapping operation; summing the delta image with the LDR training image to generate an output training image; calculating a contrast loss, the contrast loss based on the output training image and the HDR training image; calculating a compression loss, the compression loss based on the output training image and the LDR training image; and calculating a loss function based on from a weighted sum of the contrast loss and the compression loss.

Example 10 includes the subject matter of Example 9, wherein the process further comprises performing iterative backpropagation training of the neural network based on the loss function, such that the output training image converges to a compressed HDR image.

Example 11 includes the subject matter of Examples 9 or 10, wherein the weighted sum is based on a parameter selected to control a ratio of compression to preservation of contrast in the compressed HDR image.

Example 12 includes the subject matter of Examples 9-11, wherein the contrast loss is calculated as a rectilinear distance between a calculated contrast of the output training image and a calculated contrast of the HDR training image.

Example 13 includes the subject matter of Examples 9-12, wherein the calculated contrast of an image is calculated as a logarithm of a ratio of intensity of adjacent pixels of the image.

Example 14 includes the subject matter of Examples 9-13, wherein the compression loss is calculated as a rectilinear distance between a logarithm of the output training image and a logarithm of the LDR training image.

Example 15 includes the subject matter of Examples 9-14, wherein the neural network is a convolutional neural network.

Example 16 includes the subject matter of Examples 9-15, wherein the training of the neural network is unsupervised.

Example 17 is a system for perform high dynamic range (HDR) image compression, the system comprising: a global tone mapping circuit to transform an HDR image into a low dynamic range (LDR) image; a neural network trained to generate a delta image based on the HDR image and the LDR image, the delta image representing image detail lost in the global tone mapping operation, wherein the training of the neural network is an unsupervised training process to minimize a loss function calculated from a weighted sum of a contrast loss and a compression loss; and a summing circuit to sum the LDR image and the delta image to generate a compressed output image.

Example 18 includes the subject matter of Example 17, wherein the unsupervised training process comprises: performing global tone mapping on an HDR training image to generate an LDR training image; applying the neural network to the HDR training image and the LDR training image, the neural network to generate a training delta image, the training delta image representing image detail lost in the global tone mapping operation performed on the HDR training image; summing the training delta image with the LDR training image to generate an output training image; calculating the contrast loss based on the output training image and the HDR training image; calculating the compression loss based on the output training image and the LDR training image; and calculating the loss function from the weighted sum of the contrast loss and the compression loss.

Example 19 includes the subject matter of Examples 17 or 18, wherein the unsupervised training process further comprises performing iterative backpropagation training of the neural network based on the loss function, such that the output training image converges to a compressed HDR training image, and the weighted sum is based on a parameter selected to control a ratio of compression to preservation of contrast in the compressed HDR training image.

Example 20 includes the subject matter of any of Examples 17-19, wherein the neural network is a convolutional neural network.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for training a neural network to perform high dynamic range (HDR) image compression, the method comprising:
    performing, by a processor-based system, global tone mapping on an HDR training image to generate a low dynamic range (LDR) training image;
    applying, by the processor-based system, the neural network to the HDR training image and the LDR training image, the neural network to generate a delta image, the delta image representing image detail lost between the HDR training image and LDR training image;
    summing, by the processor-based system, the delta image with the LDR training image to generate an output training image;
    calculating, by the processor-based system, a contrast loss, the contrast loss based on the output training image and the HDR training image;
    calculating, by the processor-based system, a compression loss, the compression loss based on the output training image and the LDR training image; and calculating, by the processor-based system, a loss function based on a weighted sum of the contrast loss and the compression loss.

2. The method of claim 1, further including performing iterative backpropagation training of the neural network based on the loss function, such that the output training image converges to a compressed HDR image.

3. The method of claim 2, wherein the weighted sum is based on a parameter selected to control a ratio of compression to preservation of contrast in the compressed HDR image.

4. The method of claim 1, wherein the contrast loss is calculated as a rectilinear distance between a calculated contrast of the output training image and a calculated contrast of the HDR training image.

5. The method of claim 4, wherein the calculated contrast of an image is calculated as a logarithm of a ratio of intensity of adjacent pixels of the image.

6. The method of claim 1, wherein the compression loss is calculated as a rectilinear distance between a logarithm of the output training image and a logarithm of the LDR training image.

7. The method of claim 1, wherein the neural network is a convolutional neural network.

8. The method of claim 1, wherein the training of the neural network is unsupervised.

9. At least one non-transitory computer readable storage medium comprising instructions that, when executed, cause at least one processor to at least:
perform global tone mapping on an HDR training image to generate a low dynamic range (LDR) training image;
apply a neural network to the HDR training image and the LDR training image, the neural network to generate a delta image, the delta image representing image detail lost between the HDR training image and the LDR training image;
sum the delta image with the LDR training image to generate an output training image;
calculate a contrast loss, the contrast loss based on the output training image and the HDR training image;
calculate a compression loss, the compression loss based on the output training image and the LDR training image; and
calculate a loss function based on from a weighted sum of the contrast loss and the compression loss.

10. The computer readable storage medium of claim 9, wherein the instructions, when executed, cause the at least one processor to perform iterative backpropagation training of the neural network based on the loss function, such that the output training image converges to a compressed HDR image.

11. The computer readable storage medium of claim 10, wherein the weighted sum is based on a parameter selected to control a ratio of compression to preservation of contrast in the compressed HDR image.

12. The computer readable storage medium of claim 9, wherein the contrast loss is calculated as a rectilinear distance between a calculated contrast of the output training image and a calculated contrast of the HDR training image.

13. The computer readable storage medium of claim 12, wherein the calculated contrast of an image is calculated as a logarithm of a ratio of intensity of adjacent pixels of the image.

14. The computer readable storage medium of claim 9, wherein the compression loss is calculated as a rectilinear distance between a logarithm of the output training image and a logarithm of the LDR training image.

15. The computer readable storage medium of claim 9, wherein the neural network is a convolutional neural network.

16. The computer readable storage medium of claim 9, wherein the training of the neural network is unsupervised.

17. An apparatus comprising:
memory;
instructions;
at least one processor to execute the instructions to:
perform global tone mapping on an HDR training image to generate a low dynamic range (LDR) training image;
apply the neural network to the HDR training image and the LDR training image, the neural network to generate a delta image, the delta image representing image detail lost between the HDR training image and the LDR training image;
sum the delta image with the LDR training image to generate an output training image;
calculate a contrast loss, the contrast loss based on the output training image and the HDR training image;
calculate a compression loss, the compression loss based on the output training image and the LDR training image; and
calculate a loss function based on a weighted sum of the contrast loss and the compression loss.

18. The apparatus of claim 17, wherein the processor is to perform iterative backpropagation training of the neural network based on the loss function, such that the output training image converges to a compressed HDR image.

19. The apparatus of claim 18, wherein the weighted sum is based on a parameter selected to control a ratio of compression to preservation of contrast in the compressed HDR image.

20. The apparatus of claim 17, wherein the contrast loss is calculated as a rectilinear distance between a calculated contrast of the output training image and a calculated contrast of the HDR training image.

* * * * *